United States Patent [19]

Roman

[11] 4,290,703
[45] Sep. 22, 1981

[54] WINDROWING TYPE COMPOSTING APPARATUS

[75] Inventor: Walter C. Roman, Worthington, Ohio

[73] Assignee: Ultimate Resources, Inc., Westerville, Ohio

[21] Appl. No.: 114,634

[22] Filed: Jan. 23, 1980

[51] Int. Cl.³ .............................................. B02C 21/02
[52] U.S. Cl. .................................. 366/345; 241/101.7
[58] Field of Search ....................... 366/345; 241/101.7

[56] References Cited

U.S. PATENT DOCUMENTS

| | | | |
|---|---|---|---|
| 2,481,995 | 9/1949 | Godley | 366/345 X |
| 2,661,584 | 12/1953 | Ronning | 241/101.7 X |
| 2,849,851 | 9/1958 | Hayter | 241/101.7 X |
| 2,988,367 | 6/1961 | Erny | 241/101.7 |
| 3,369,797 | 2/1968 | Cobey | 241/101.7 X |
| 3,606,265 | 9/1971 | Cobey | 241/231 |
| 3,664,645 | 5/1972 | Cobey | 366/345 X |
| 3,733,033 | 5/1973 | Cobey | 366/345 X |
| 3,858,814 | 1/1975 | Wagner | 366/345 X |

Primary Examiner—Philip R. Coe
Attorney, Agent, or Firm—Mueller and Smith

[57] ABSTRACT

Windrowing apparatus for laterally transferring an elongate row of waste material wherein a windrow conveyor is supported for movement by three pivotally mounted and freely rotatable wheels. The apparatus may be coupled or decoupled from a conventional front end loader and the wheels are so spaced and positioned as to permit the windrow conveyor to confront a row of waste while remaining protected from "climbing up" on the waste material. Considerably improved flexibility in the operation of a windrowing facility is effected with the apparatus.

11 Claims, 5 Drawing Figures

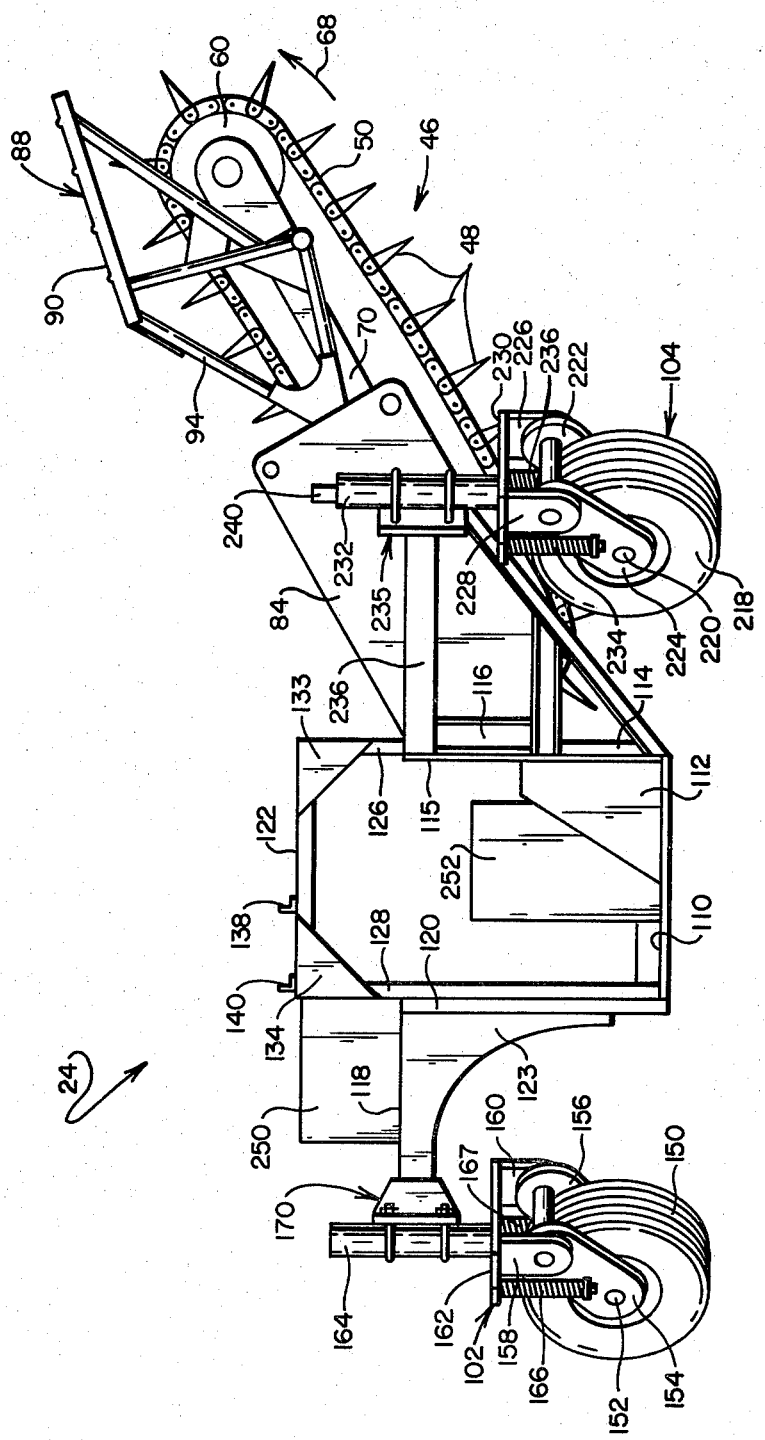

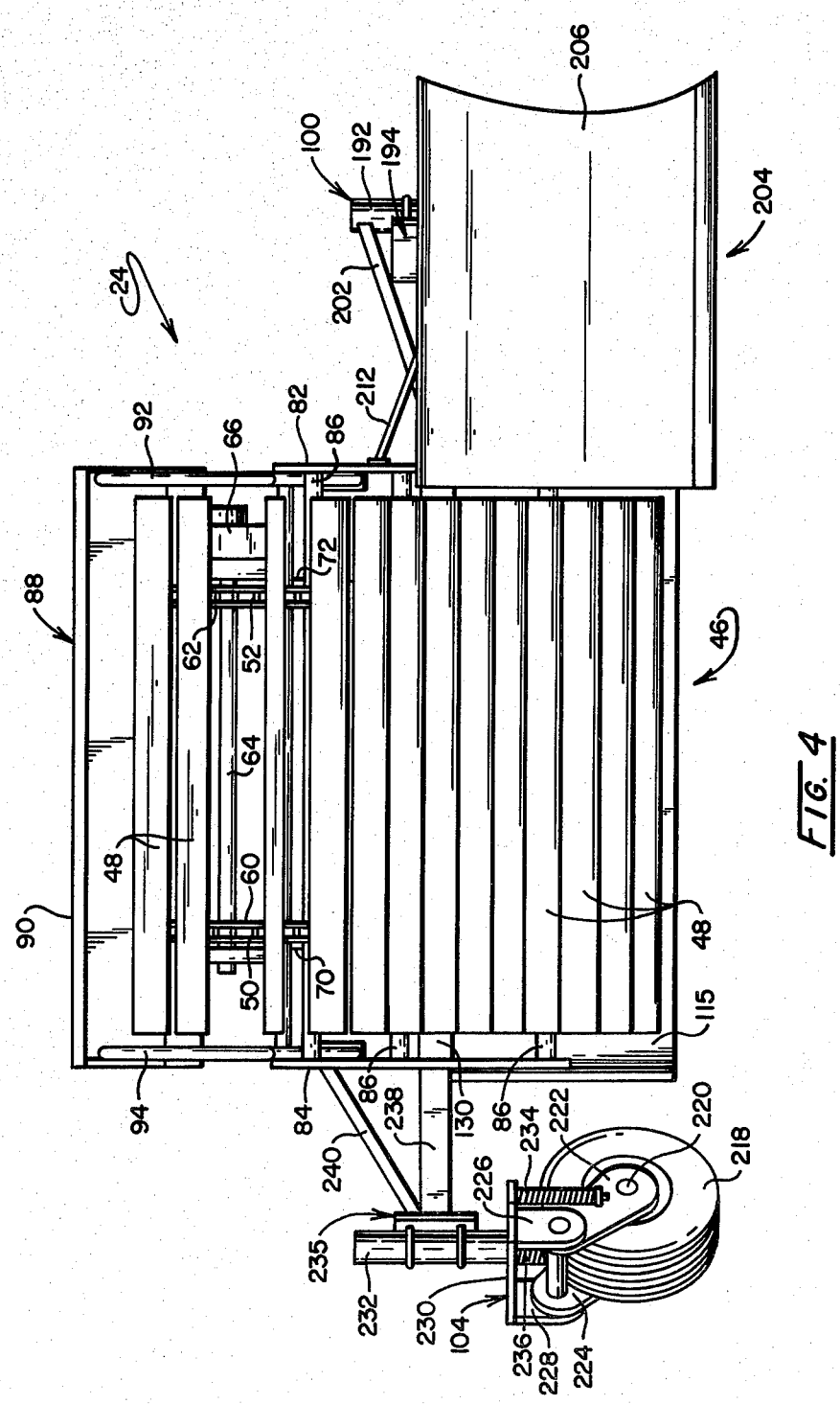

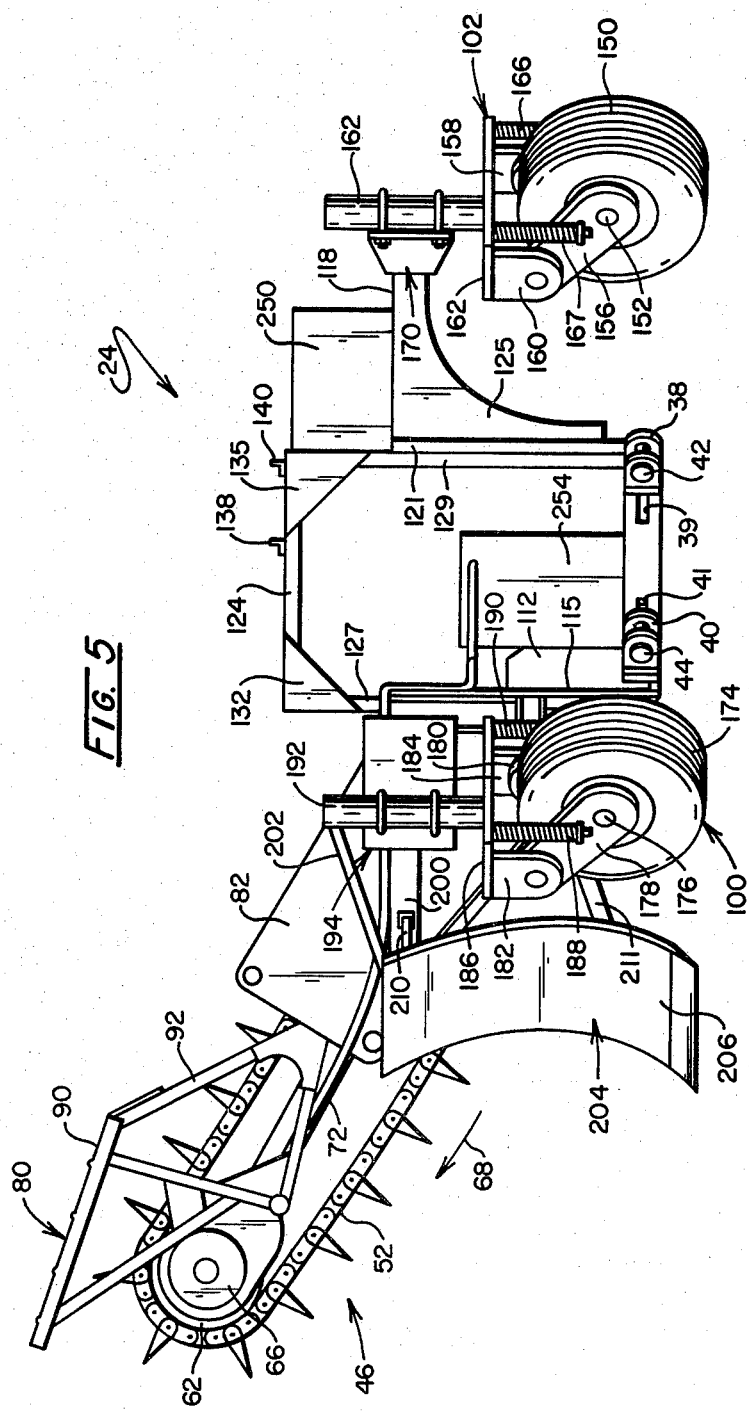

WINDROWING TYPE COMPOSTING APPARATUS

BACKGROUND OF THE INVENTION

The treatment of waste, whether generated through municipal collection systems or through a broad range of industries, may be observed to vary from simple land-fill techniques to somewhat sophisticated chemical and biochemical conversion methods. With the latter methods, significant capital commitments generally are called for which require justification by virtue of environmental protection requirements and/or the generation of profitable by-products.

Controlled composting procedures are considered to offer significant promise for providing for an improved disposal of biodegradable industrial and municipal wastes while generating a somewhat valuable by-product. The preferred approach to treatment of wastes by biodegradation is one wherein composting is carried out in the thermophilic phase at temperatures of about 45°–50° C. At such temperatures, bacteria otherwise active in a mesophilic phase at lower temperatures are avoided and noxious odors are not present in the process.

To achieve thermophilic phase digestion, adequate aeration and agitation of the material is required. Generally, the approach to carrying out thermophilic digestion requiring the lowest capital investment is that of windrowing the waste material. With this approach, long rows of waste are developed which are laterally transferred and, consequently, aerated and agitated by a windrowing device. Thus, the waste material is progressively transferred from one row position to a next, for example, from right to left, across a treatment region over a period of time until a last row position is reached at which point the digestive process is completed and a valuable by-product is available for commercial sale. Such by-products find use, for example, as a surface treatment for strip mine soil reclamation or soil rejuvenation.

The type windrowing machine currently finding favor in the industry is one resembling a flight conveyor having a series of parallel, elongate paddles which are mutually interconnected by continuous chains and driven by a hydraulic motor. In operation, a rather large front end loader is utilized to suspend the conveyor at an angle both with respect to the ground and the axis of the windrow pile while moving forward at a relatively low speed, for instance 1 m.p.h., such that the lower disposed region or side of the conveyor confronts the row of material and, in effect, thrusts it into an adjacent row. Generally, these rows, which have a width of about 10–12 feet, will be transversely moved such that adjacent rows become spaced about 15 feet apart from center-to-center. The type of front end loader utilized for this procedure must be a dedicated one in view of the somewhat large and customized support arrangement for the conveyor. Typically, a 202 horsepower loader weighing about 26 tons is utilized. The dedication of the loader to the task of windrowing does not permit its additional convenient use as a loader per se in the treatment facility, a function which must be supplied by additional loading machinery and consequent added capital investment. Another difficulty ensues with the dedicated devices, inasmuch as at least two windrowing components, each with dedicated loader must be utilized. This requirement is occasioned, inasmuch as there inherently is a forward vector involved in the windrowing procedure such that the rows of material will tend to move forwardly as an entity. To counteract this movement, the windrowing devices must operate in a right and left reversal sense, one windrowing machine working from one end of the array of rows of waste material, while the other windrowing device operates in the opposite direction from the opposite side of the row array.

SUMMARY

The present invention is addressed to windrowing apparatus which operates effectively to carry out composting procedures and which does not require a dedicated prime mover such as a front end loader of customized design. With the apparatus of the invention, the flight-type windrow conveyor is supported forwardly upon a rigid frame which, in turn, is supported by freely rotatable wheels. By so positioning these wheels about the frame, the windrow conveyor is properly positioned to confront a row of waste material being transferred and the supporting wheels of the frame of the apparatus do not encounter the waste. Of particular advantage, a loader or prime mover may be utilized which is not dedicated to the windrowing task. Further, inasmuch as the frame need not be supported by the loader, a smaller size prime mover may be employed, for example, a loader of about 111 horsepower weighing about 10 tons. Additionally, right and left hand transferring arrangements may be provided with the apparatus of the invention without having to provide separate prime movers for each. When windrowing duties are not required of a front end loader utilized with the apparatus of the invention, it may be employed to carry out other duties in the composting arena such as the loading of shredding devices, the loading of finally digested product into trucks and the like.

Another feature and object of the invention is to provide windrowing apparatus for laterally transferring an elongate row of biodegradable material, that row being oriented along a given centrally disposed axis and having a predetermined width. The apparatus includes a conventional windrow flight-type conveyor having spaced, parallel and mutually interconnected elongate paddles or flights which are drivably movable and have a downwardly disposed region which is intended for confrontation with the waste material within each row. A hydraulic motor arrangement drives these paddles and a rigid frame is provided along with mounting means for mounting the windrow conveyor at a forwardly disposed portion of the frame. The paddles or flights within the conveyor are disposed at an acute angle with respect to a principal vector of movement of the entire apparatus. For this purpose, a coupling arrangement is provided at the rearward portion of the frame which provides for universal connection of the frame with the standard couplings of, for example, a front end loader. This loader then pushes the entire frame and thus develops a principal horizontal vector of force which, during conventional operation, is in parallel and in alignment with the axis of the elongate row of biodegradable material. First and second wheels are connected with the frame at the rearward portion of it substantially behind the windrow conveyor and a third support, which may be present as a freely rotatable wheel, is positioned forwardly of the rearward wheels and at a position such that it is located at the edge of the row of biodegradable material when the apparatus confronts that material for windrowing purposes.

Other objects of the invention will, in part, be obvious and will, in part, appear hereinafter.

The invention, accordingly, comprises the apparatus possessing the construction, combination of elements and arrangement of parts which are exemplified in the following detailed disclosure.

For a fuller understanding of the nature and objects of the invention, reference should be had to the following description taken in connection with the accompanying drawings.

BRIEF DESCRIPTION OF THE DRAWINGS

FIG. 3 is an elevational view of the apparatus of FIG. 2 taken in a direction parallel to the elongate paddles of the windrowing components;

FIG. 4 is an elevational view of the apparatus of FIG. 2 taken in a direction perpendicular to the aforesaid elongate paddles of the apparatus; and FIG. 5 is an elevational view taken along the principal vector of movement of the windrowing apparatus according to the invention.

DETAILED DESCRIPTION

Figure 1:
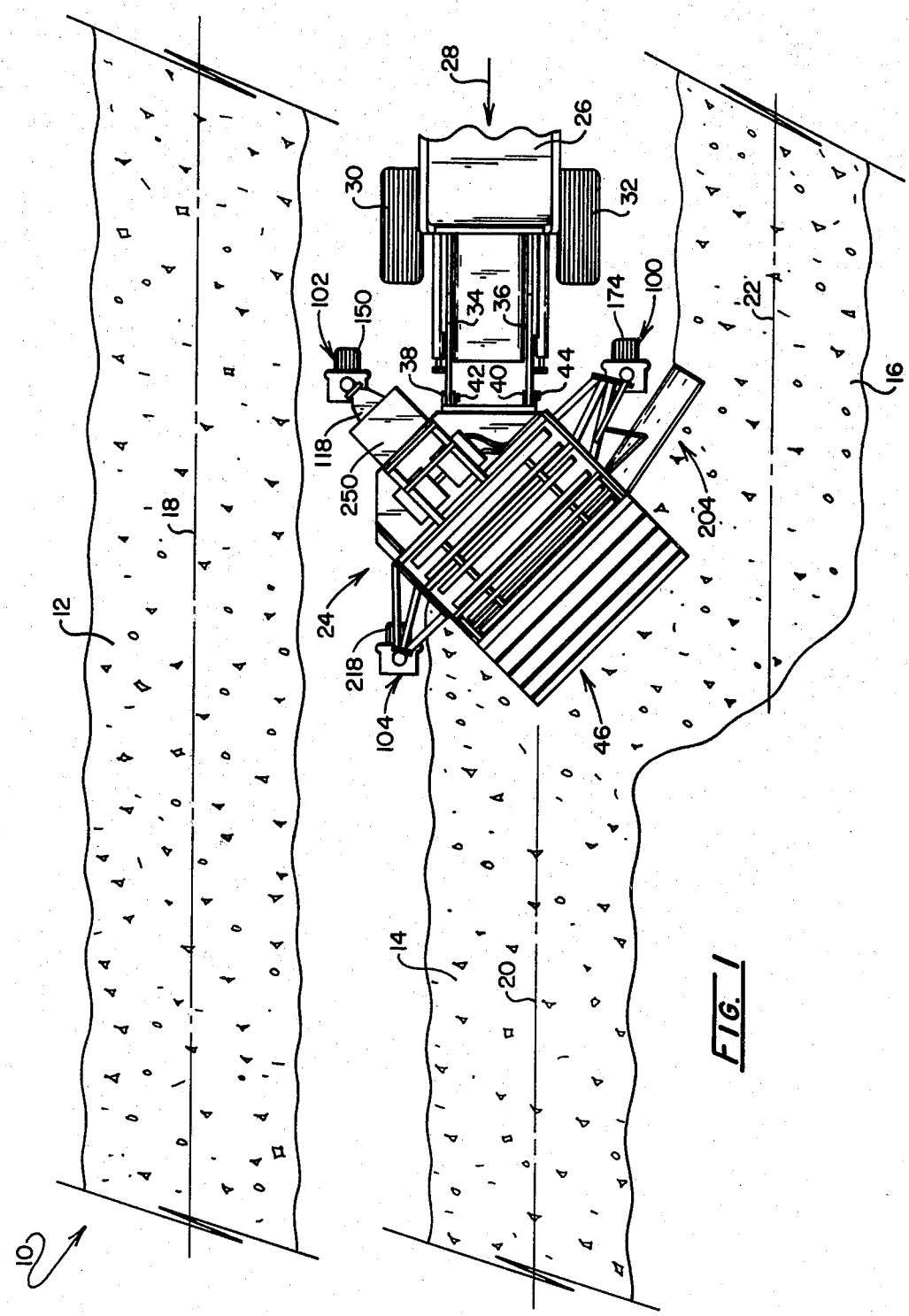
FIG. 1 is a top fragmentary view of windrowing apparatus according to the invention shown as attached to a conventional front end loader and illustrated in conjunction with two adjacent windrows of biodegradable waste material.

Referring to FIG. 1, an overhead view of a portion of a treatment region is represented generally at 10. Such treatment regions 10 preferably are provided having a paved surface sufficient to support machinery and the like and will include facilities for applying moisture to the waste undergoing treatment. Such biodegradable waste is represented within region 10 in schematic fashion as rows thereof at 12, 14 and 16. Each of the rows 12, 14 and 16 are shown as being oriented along a centrally disposed axis, for example, windrow 12 is symmetrically oriented about axis 18, windrow 14 is symmetrically oriented about axis 20 and windrow 16 is symmetrically oriented about axis 22. As indicated above, these rows will have a width of about 10 to 12 feet and adjacent rows will be spaced apart about 15 feet from center-to-center.

Windrowing apparatus according to the invention is represented generally at 24 in operational confrontation with the biodegradable material within windrow 14. Apparatus 24 is pushed by a front end loader, the forward portion of which is represented at 26. Movement of the apparatus 24 into windrow 14 causes an agitation of the material therein and a generally lateral "thrusting" of it to establish the adjacent and thus agitated windrow of material as at 16. This movement of apparatus 24 generally is along a vector represented by arrow 28 and takes place at a speed of about 1 m.p.h. Loader or prime mover 26 is shown in the figure as having two front drive wheels 30 and 32 as well as conventional hydraulically driven arms 34 and 36 which, in normal loader use, are coupled to a bucket. In their present employment, however, the arms are connected to corresponding pivotal mounts 38 and 40 fixed to but adjustable upon apparatus 24. Pins 42 and 44 are shown coupling the loader arms to respective mounts 38 and 40. These pins 42 and 44 are readily, manually removable such that loader 26 is disconnectible from apparatus 24 for reconnection with a standard bucket, thus, permitting its use within the treatment facility as a conventional front end loader. Lateral adjustment of mounts 38 and 40 upon apparatus 24 may be provided by their bolted connection thereto through respective slots 39 and 41 (see FIG. 5). Such adjustment permits the use of apparatus 24 with a variety of prime mover devices.

Figure 2:
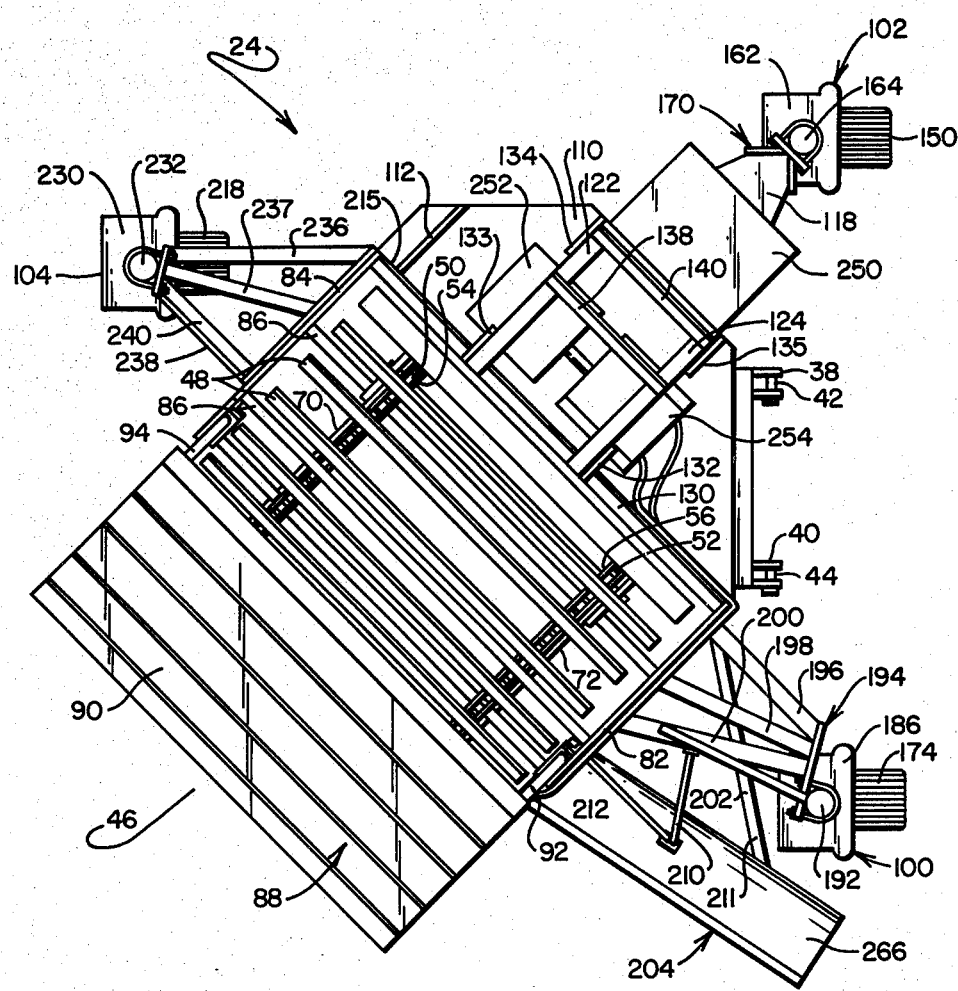
FIG. 2 is a top view of the windrow apparatus of the invention.

Referring additionally to FIGS. 2, 3 and 5, apparatus 24 is shown to support a windrow conveyor represented generally at 46 which is comprised of a plurality of spaced, parallel and elongate paddles or flights, certain of which are identified at 48. These paddles 48 are mutually interconnected by parallel, endless chains 50 and 52. Chains 50 and 52 extend about sprockets, the lowermost disposed of these sprockets being revealed in FIG. 2 at 54 and 56, chain 50 extending about sprocket 54 and chain 52 extending about sprocket 56. Sprockets 54 and 56 are mounted for free rotation upon an axle hidden from view in FIG. 2 but supported by side plate and beam assemblies 70 and 72 (FIGS. 3 and 5).

Referring to FIGS. 3, 4 and 5, upwardly disposed sprockets 60 and 62 provide drive to respective chains 50 and 52 in consequence of their fixed coupling with axle 64 which extends, in turn, from a hydraulic motor 66. Motor 66 drives the windrow conveyor 46 such that the elongate flights or paddles 48 move in the direction represented by arrow 68 shown in FIGS. 3 and 5. Axle 64 is journaled for rotation within side plate and beam assemblies 70 and 72, assembly 72 also supporting hydraulic motor 66. Principal support for conveyor 46 is provided by plates 82 and 84 which are structurally secured by a series of cross-members extending over the top of the assembly, certain of which are identified at 86.

Fixed to and extending from plates 82 and 84 is a shield assembly 88 including a sheet metal top portion 90 and supporting brace assemblies shown generally at 92 and 94 (FIGS. 3 and 5). The downardly disposed region of windrow conveyor 46 as is revealed most clearly in FIG. 4 is that portion of it which confronts and causes the transference of a windrow.

Heretofore, the windrow conveyor 46 as thus described has been coupled to be maneuvered while held in the general orientation shown by a dedicated front end loader. As such, the device was retained forwardly of all of the wheels of the loader and was urged into a windrow of waste material while being driven by hydraulic motor 66, in turn, driven from the hydraulic system of the loader. The direction of movement of the combination has been described in connection with arrow 28 in FIG. 1. Shield 88 serves the function of preventing a rearward carry-over of the waste material being agitated by the assembly. Further description of windrow conveyors as at 46 is provided in U.S. Pat. No. 3,664,645, which is incorporated herein by reference. Because of the necessity for supporting conveyor 46 well forward of the prime mover, relatively heavy and costly front end loaders have been required having customized support structures permanently affixed thereto. For example, as indicated earlier, a typical prime mover for supporting the windrow conveyor weighs about 26 tons and requires a 202 horsepower motor. With the independent supporting structures of the present invention, such large prime movers are not required and need not be of a customized or dedicated variety.

FIGS. 1 and 2 reveal that the apparatus 24 of the invention serves to support windrow conveyor 46 through the utilization of a rigid frame, supported, in turn, by three freely rotatable wheel assemblies represented generally at 100, 102 and 104. The frame assembly includes a rearwardly disposed portion, as considered with respect to its direction of movement, which, as shown in FIGS. 2, 3 and 5 includes a lower platform 110, the forward portion of which is coupled, as shown in FIG. 3, to upwardly extending weldably interconnected framing members including angle 114 and beam 116 and which connection is reinforced by gusset 112. FIGS. 3 and 5 further reveal that the forward portion of platform 110 is welded to a wide metal plate 115 extending across the entire rearward portion of the apparatus. Supporting plates 82 and 84 of conveyor 46 are welded to and extend from the opposite surface of plate 115.

The rearwardly disposed portion of platform 110 is connected by two spaced, parallel upstanding channel members 120 and 121 to a an elevated platform 118. (See FIGS. 3 and 5) Platform 118 principally is supported by a "V" shaped structure comprised of two identical and rearwardly extending flanges, one of which is shown in FIG. 3 at 123 and the other of which is shown in FIG. 5 and 125.

Platform 110 is surmounted by a centrally disposed framework including earlier-described channels 120 and 121 welded to channels 128 and 129 (FIGS. 3 and 5) as well as two spaced and parallel channels 122 and 124 (FIGS. 2, 3 and 5). The latter channels 122 and 124 are connected to channels 128 and 129. Channels 122 and 124 extend across platform 110 and are welded to corresponding upstanding channels one of which is shown in FIG. 3 at 126 and the other of which is shown in FIG. 5 and 127. FIG. 2 further reveals that the latter channels 126 and 127 are weldably connected to a box beam 130 extending across the entire assembly. Beam 130 is welded to and supports plate 115. The structural framework above platform 110 further is strengthened by four gussets 132–135, and angles 138 and 140 extend across the top thereof for purposes of supporting auxiliary equipment.

Looking to the rearwardly disposed wheel assemblies FIGS. 3 and 5 show the structure of assembly 102 in detail. This assembly includes a conventional pneumatic tire and hub assembly 150 which rotates freely about an axis 152 which, in turn, extends between parallel coupling members 154 and 156. The latter members, in turn, are pivotally connected to respective spaced supports 158 and 160. The latter supports are welded to an upwardly disposed platform 162 which is fixed to an upstanding axle (not shown) journaled for free rotation within corresponding upstanding bearing 164. Thus, the assembly is capable of full pivotal movement about a central axis extending through bearing 164. Spring members as at 166 and 167 extend downwardly from platform 162 to connection with coupling members 154 and 156 to provide a conventional spring suspension for the tire and hub assembly 150. Bearing 164 is connected to flange members 123 and 125 by a bracket assembly 170. Bracket assembly 170 includes spaced parallel U-bolts which surround and retain bearing 164 in appropriate position.

Looking to FIGS. 2 and 5, wheel assembly 100 is seen to be similarly structured, including a tire and hub assembly 174 which is freely rotatable about an axle 176 which, in turn, extends between parallel coupling members 178 and 180. Members 178 and 180, in turn, are pivotally connected to spaced supports 182 and 184 which extend downwardly from a platform 186. As before, coupling members 154 and 156 provide for a spring suspension of tire and hub assembly 174 through their connection with respective springs 188 and 190 to the underside of platform 186. A vertically oriented axle (not shown) is fixed to the upwardly disposed side of platform 186 and is journaled for full rotation within a corresponding upstanding bearing 192. Thus, the tire and hub assembly 174 is provided complete pivotal freedom. Bearing 192 is mounted, as before, by a U-bolt containing bracket assembly 194 which, in turn, is mounted upon the apparatus 24 in an "outrigger" fashion. In this regard, bracket assembly 194 is supported by three rigid frame components present as channels 196, 198 and 200 which are welded to side support 82. An additional angle strut 202 is welded between channel 200 and bracket assembly 194.

FIG. 1 reveals that wheel assembly 100 is positioned such that it confronts a portion of the row of waste being windrowed. To provide improved row definition as well as to protect wheel assembly 100 from this waste, a plow assembly represented generally at 204 is provided. Assembly 204 includes a blade 206 which is supported in position by struts 210, 211 and 212. Note, that strut 210 extends from blade 206 to channel 200, while struts 211 and 212 are connected to side support 82. The edge of plow assembly blade 206 adjacent to coneyor 46 is shown having a contour designed such that its entire edge is spaced from the moving edges of paddles 48 a distance of about one inch. This spacing not only serves to improve the protection of wheel assembly 100, but also serves a "cleaning" purpose with respect to paddles 48.

Referring to FIGS. 2, 3 and 4, the third support for apparatus 24 is provided by wheel assembly 104. Similar to assemblies 100 and 102, assembly 104 includes a tire and hub assembly 218 which is freely rotatable about an axle 220 suspended between parallel coupling members 222 and 224. Coupling members 222 and 224 are, respectively, pivotally connected to spaced supports 226 and 228 which, in turn, depend downwardly from platform 230. Fixed to and extending upwardly from platform 230 is an axle (not shown) which is journaled for rotation within bearing 232. Coupling members 222 and 224 are, respectively, connected to platform 230 through springs 234 and 236 to provide conventional spring suspension for the tire and hub assembly 218 which is freely pivotal about bearing 232. Bearing 232 is connected through a bracket assembly 235 incorporating a U-bolt connection arrangement to another "outrigger" frame portion including channel components 236, 237 and 238 extending in horizontal fashion to the frame and an angularly oriented channel support 240 extending from bracket 235 to side support 84 (See FIG. 4).

Referring to FIGS. 1 and 2, it may be observed that wheel assemblies 100 and 102 are positioned generally toward the rearward portion of apparatus 24 as considered in the sense of its movement along vector 28. When moved along principal vector 28, tire and hub assemblies 174 and 150 rotate about what is essentially a common axis. During such movement, wheel assembly 102 is positioned outwardly of the waste material 14 being windrowed, while assembly 100 is in alignment with an outer portion of the material but is protected by plow assembly 204. The third support, wheel assembly 104, is positioned such that tire and hub assembly 218 is located substantially in alignment with an edge of the waste material within row 14. Thus, all three wheel assemblies 100, 102 and 104 are protected from confronting and "climbing up" any of the material within windrow 14. However, the lower region of windrowing conveyor 46 is permitted to confront waste within the row and properly agitate and transfer it. Where desired, the center of gravity of the entire apparatus 24 may be adjusted by positioning a weight 250 on platform 118. Additionally, while it is preferred to utilize the hydrualic system of the front end loader pushing apparatus 24, for some applications it may be desirable to provide an internal combustion engine within apparatus 24 along with a hydraulic pump for providing pressurized fluid for motor 66. Such a motor arrangement may be positioned upon platform 110 as at 252 for driving a pump as at 254 (See FIGS. 2, 3 and 5). A hydraulic line is shown extending from pump 254 toward motor 66 (FIG. 5). Alternately, these implements may be positioned upon cross supports 138 and 140.

In general applications, it is desirable to provide apparatus 24 in two configurations, one for pile transfer from right to left as represented in FIG. 1, and another for providing transfer in a reversed orientation for use along a vector representing the reverse of that shown at 28. With two such implements, each capable of being driven from a singular prime mover as at 26, the forward movement of the windrows is compensated for. As is apparent, the opposite vector arrangement may utilize the same design described herein but in a mirror reversal orientation.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. Windrowing apparatus for laterally transferring an elongate row of biodegradable material, said row being oriented along a given centrally disposed axis and having a given width, comprising:
   a windrow conveyor having spaced, parallel mutually interconnected elongate paddles driveably movable and having a downwardly disposed region for confronting said row of material and progressively moving said material to form an adjacent said row thereof;
   motor means for driving said paddles;
   a rigid frame;
   coupling means rearwardly disposed upon said frame for connecting said frame with the forward portion of a drive vehicle, said vehicle serving to push said apparatus in a forward direction having a principal horizontal vector substantially parallel and in alignment with said axis when said conveyor confronts said row;
   mounting means for mounting said conveyor at a forwardly disposed portion of said frame such that said paddles within said downwardly disposed region are disposed at an acute angle with respect to said principal vector when said conveyor is urged into said confrontation with said row;
   first and second freely rotatable wheel means connected with said frame and each being freely pivotal about vertical axes for supporting said frame for movement, said first and second wheel means being spaced apart having respective positions of attachment with said frame generally rearward of said conveyor and mutually disposed on opposite sides of said coupling means, said first wheel means being disposed at a first said side rearwardly of said conveyor downwardly disposed region, said second wheel means being disposed at a second said side outwardly of said downwardly disposed region; and
   third freely rotatable wheel means freely pivotal about a vertical axis and attached to said frame at said second side in the vicinity of the forward portion of said downwardly disposed region for supporting said frame for movement at a predetermined level.

2. The windrowing apparatus of claim 1 wherein said third wheel means is located substantially in alignment with an edge of said row of material when said conveyor is urged into said confrontation with said row.

3. The windrowing apparatus of claim 1 wherein said third wheel means is configured for carrying out the adjustment of the level of said frame forward position so as to provide for the adjustment of the level of said windrow conveyor.

4. The windrowing apparatus of claim 1 wherein said third wheel means is located substantially in alignment with an edge of said row of material when said conveyor is urged into said confrontation with said row; and
   further is configured for carrying out the adjustment of the level of said frame forward position so as to provide for the adjustment of the level of said windrow conveyor.

5. The windrowing apparatus of claim 1 wherein said first and second wheel means are rotatable substantially about a common axis when said apparatus is pushed in said forward direction.

6. The windrowing apparatus of claim 5 wherein said common axis is generally perpendicular to said principal vector.

7. The windrowing apparatus of claim 1 including:
   internal combustion motor means mounted upon said frame rearward portion in the vicinity of said second wheel means; and
   hydraulic pump means connected in driven relationship with said internal combustion motor means and in driving relationship with said motor means for driving said paddles.

8. The windrowing apparatus of claim 1 further comprising:
   plow means coupled to said frame forwardly disposed portion adjacent to and outwardly disposed from said windrow conveyor; and
   said first wheel means is positioned behind said plow means so as to be shielded thereby from said biodegradable material.

9. The windrowing apparatus of claim 1 further comprising weight means positioned upon said frame rearward portion in the vicinity of said second wheel means.

10. The windrowing apparatus of claim 1 in which said coupling means comprises two, spaced releasable connectors.

11. The windrowing apparatus of claim 10 in which said coupling means is configured to effect an attachment with said vehicle which is pivotal about a horizontal axis.

* * * * *